United States Patent
Kwon

(10) Patent No.: US 10,984,025 B2
(45) Date of Patent: Apr. 20, 2021

(54) DEVICE AND METHOD FOR DISPLAYING AND SEARCHING FOR LOCATION BY USING GRID AND WORDS

(71) Applicants: John Kwon, Seoul (KR); INFOSEED, INC., Uiwang-si (KR)

(72) Inventor: John Kwon, Seoul (KR)

(73) Assignees: John Kwon, Seoul (KR); INFOSEED, INC., Uiwang-si (KR)

( * ) Notice: Subject to any disclaimer, the term of this patent is extended or adjusted under 35 U.S.C. 154(b) by 0 days.

(21) Appl. No.: 16/499,325

(22) PCT Filed: Feb. 27, 2018

(86) PCT No.: PCT/KR2018/002397
§ 371 (c)(1),
(2) Date: Sep. 30, 2019

(87) PCT Pub. No.: WO2018/186591
PCT Pub. Date: Oct. 11, 2018

(65) Prior Publication Data
US 2020/0380018 A1    Dec. 3, 2020

(30) Foreign Application Priority Data
Apr. 6, 2017 (KR) .................. 10-2017-0044690

(51) Int. Cl.
*G06F 16/29* (2019.01)
*G06F 16/2457* (2019.01)
(Continued)

(52) U.S. Cl.
CPC ......... *G06F 16/29* (2019.01); *G01C 21/3476* (2013.01); *G06F 16/24575* (2019.01); *G09B 29/007* (2013.01)

(58) Field of Classification Search
CPC ............... G06F 16/29; G06F 16/24575; G01C 21/3476; G09B 29/007
(Continued)

(56) References Cited

U.S. PATENT DOCUMENTS 7,577,244 B2 * 8/2009 Taschereau ........ G06Q 30/0241
379/218.01
8,239,130 B1 * 8/2012 Upstill ............... G01C 21/3679
701/426
(Continued)

FOREIGN PATENT DOCUMENTS

KR   10-2002-0000308   1/2002
KR   10-2002-0005306   1/2002
(Continued)

*Primary Examiner* — Mong-Thuy T Tran
(74) *Attorney, Agent, or Firm* — Lex IP Meister, PLLC

(57) ABSTRACT

The present invention relates to a device and a method for displaying and searching for a location by using a grid and words, and the device for displaying and searching for a location by using a grid and words according to the present invention includes: a location keyword storage unit for storing information on grid IDs allocated to a plurality of unit grids for dividing a geographical area to be a location display object, respectively, and location keywords each of which has a structure having a plurality of words arranged therein, such that the grid IDs and the location keywords are matched to each other; a grid search unit that searches for a grid ID matched to a specific location keyword and outputs representative coordinates of a unit grid corresponding to the searched grid ID, if the specific location keyword is inputted; and a location keyword search unit that searches for at least one location keyword matched to the grid ID of a unit grid including geographical coordinates related to a specific location and outputs the searched location keyword, if the geographical coordinates are inputted.

11 Claims, 9 Drawing Sheets

(51) Int. Cl.
    *G01C 21/34*    (2006.01)
    *G09B 29/00*    (2006.01)

(58) Field of Classification Search
    USPC ...................................................... 455/456.1
    See application file for complete search history.

(56) References Cited

U.S. PATENT DOCUMENTS

| | | | | |
|---|---|---|---|---|
| 8,965,689 | B1* | 2/2015 | McMullen | G01C 21/3682 |
| | | | | 701/451 |
| 9,104,695 | B1* | 8/2015 | Cervelli | G01C 21/3664 |
| 9,311,416 | B1* | 4/2016 | Goel | G06F 16/248 |
| 9,390,136 | B2* | 7/2016 | Bezancon | G06F 16/29 |
| 2006/0218114 | A1* | 9/2006 | Weare | G06F 16/9537 |
| 2010/0217480 | A1* | 8/2010 | Link, II | G06F 16/41 |
| | | | | 701/31.4 |
| 2011/0007076 | A1* | 1/2011 | Nielsen | G06F 16/29 |
| | | | | 345/441 |
| 2012/0158289 | A1* | 6/2012 | Bernheim Brush | G06F 16/248 |
| | | | | 701/425 |
| 2013/0073686 | A1* | 3/2013 | Sandholm | G06Q 30/0631 |
| | | | | 709/219 |
| 2014/0207748 | A1* | 7/2014 | Sood | G06F 16/9537 |
| | | | | 707/706 |
| 2014/0207795 | A1* | 7/2014 | Zhou | G06F 16/24578 |
| | | | | 707/748 |
| 2014/0351255 | A1* | 11/2014 | Choi | G06F 16/3322 |
| | | | | 707/739 |
| 2015/0220545 | A1* | 8/2015 | Park | G06F 16/9537 |
| | | | | 707/711 |
| 2016/0212201 | A1* | 7/2016 | Munemann | H04L 67/306 |
| 2016/0267149 | A1* | 9/2016 | Park | G06F 3/0482 |
| 2017/0052654 | A1* | 2/2017 | Cervelli | G06T 19/006 |
| 2018/0095979 | A1* | 4/2018 | Tang | G06F 16/3322 |
| 2018/0267982 | A1* | 9/2018 | Hurst | G16B 45/00 |

FOREIGN PATENT DOCUMENTS

| | | |
|---|---|---|
| KR | 10-2010-0079340 | 7/2010 |
| KR | 10-2013-0085011 | 7/2013 |
| KR | 10-2014-0097805 | 8/2014 |

\* cited by examiner

FIG. 3
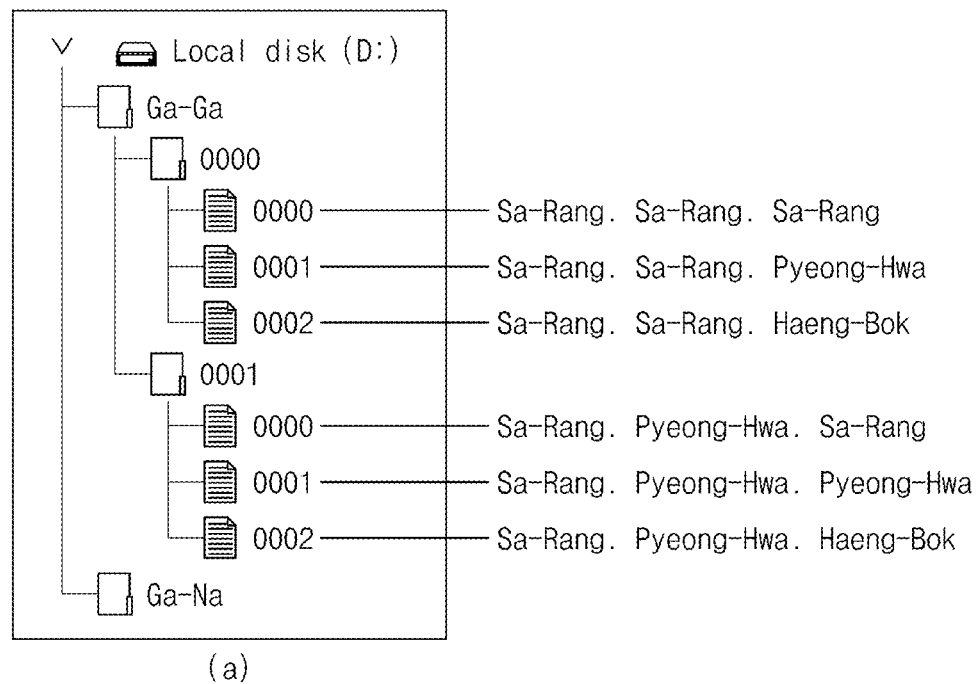
(a)
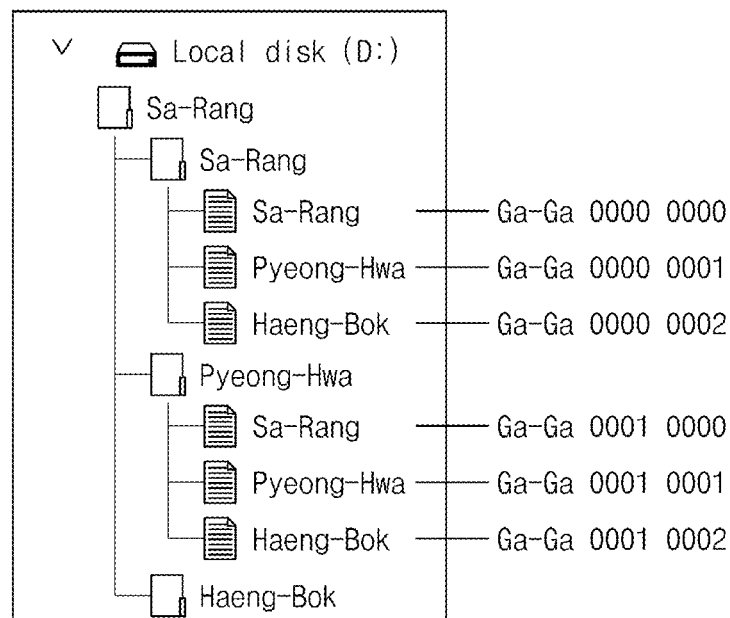
(b)

FIG. 4

```
<word id = 0>Sa-Rang</word>
<word id = 1>Pyeong-Hwa</word>
<word id = 2>Haeng-Bok</word>
      ... omitted ...
<word id = 1775>Him</word>
```

(a)

```
L_words[0] = Sa-Rang
L_words[1] = Pyeong-Hwa
L_words[2] = Haeng-Bok
   ... omitted ...
L_words[1775] = Him
```

(b)

| word ID | word |
|---|---|
| 0 | Sa-Rang |
| 1 | Pyeong-Hwa |
| 2 | Haeng-Bok |
| ... omitted ... | |
| 1775 | Him |

| T_Uni_Loca_Key | |
|---|---|
| PK Variable Location Keyword | Beautiful. Our. Nature |
| Word No. 1 | Beautiful |
| Word No. 2 | Our |
| Word No. 3 | Nature |
| Grid ID | Ga-Ga 0000 0000 |
| Fixed Location Keyword | Sa-Rang. Sa-Rang. Sa-Rang |
| centerX | 700,005 |
| conterY | 1,300,005 |
| minX | 700,000 |
| minY | 1,300,000 |
| maxX | 700,010 |
| maxY | 1,300,010 |
| CreateDate | 2017-03-20 14:23:05 |
| UpdatedDate | 2017-04-21 16:25:09 |
| ExpireDate | 2018-03-20 14:23:05 |
| Admin_Email | john@infoseed.kr |

FIG. 9

| | T_NPN | |
|---|---|---|
| PK | Grid_ID | Ga-Ga 0000 0000 |
| | centerX | 700,005 |
| | conterY | 1,300,005 |
| | minX | 700,000 |
| | minY | 1,300,000 |
| | maxX | 700,010 |
| | maxY | 1,300,010 |

DEVICE AND METHOD FOR DISPLAYING AND SEARCHING FOR LOCATION BY USING GRID AND WORDS

TECHNICAL FIELD

The present invention relates to a device and a method for displaying and searching for a location by using a grid and words, and more particularly, to a device and a method for displaying and searching for a location by using a grid and words, which identify and communicate locations in a human-friendly way in communicating locations between human beings and between human beings and the device.

BACKGROUND ART

In recent years, devices capable of being incorporated in various devices so as to display and search for the locations of the devices on the basis of GPS have been generally used.

Not only in specialized navigation devices but also in smart phones, similar mobile communication devices, and general computing devices, GPS-based location display devices are included.

The use of geometric numerical coordinates for identifying locations, like latitude and longitude coordinates or grid references is known, and in general, satellite-based positioning systems identify locations by using such numerical coordinates. For example, the GPS system identifies locations by principally using GPS coordinates existing as high-resolution latitude and longitude coordinates.

A practical problem of the use of numerical coordinates for identifying locations is that derived strings of numbers are so user-unfriendly. Actually, people generally know that it is difficult to accurately memorize strings of numbers or verbally communicate strings of numbers to other people. Moreover, for example, saying where I wants to go into a navigation device, or manually and accurately inputting a string of numbers to a device in order to include a location in a text message to be sent to another person is a relatively very inefficient way.

In some cases, locations are identified by means other than numerical coordinates, like addresses or zip codes; however, this means have a problem that they may be relatively inaccurate as compared to numerical coordinates and are generally allocated to buildings. Particularly, zip codes are generally allocated to groups of buildings with respect to buildings existing at locations which are expected to become the destinations of mails. As a result, this means are useful only in urban areas having appropriate codes, names, and numbers allocated thereto with high density. Moreover, it is not necessarily easier to memorize or verbally communicate zip codes as compared to numerical coordinates.

Furthermore, since countries and regions use different address systems, and most address systems are not permanent and are changed, in order to identify more precise locations, the form of longer and more complicated combinations of numbers and characters is required.

Location identifying means using grid references or grid systems like the Korean national index number system, the British NGRS, and the USNG of the United States use codes which are combinations of characters and numbers, as the grid IDs Grid_ID of grids for specifying locations. The location identifying means using the grid systems have an advantage of being relatively permanent and being capable of more accurately identifying locations as compared to the address systems; however, location identification codes allocated in the code form are not necessarily convenient and easy for memorizing or verbally communicating.

DISCLOSURE

Technical Problem

Therefore, an object of the present invention is to provide a device and a method for displaying and searching for a location by using a grid and words, which can overcome the above-mentioned problems of the related art.

Another object of the present invention is to provide a device and a method which display and search for a location by using a grid and words easy to memorize, and pronounce, and verbally communicate, and can provide an online map service by displaying a location using a grid system and a combination of a plurality of words.

A further object of the present invention is to provide a device and a method for displaying and searching for a location by using a grid and words capable of displaying and indicating each location with respect to locations which have no addresses or are difficult to accurately indicate, and identifying a location regardless of change of the address and change of the display mode.

A still further object of the present invention is to provide a device and a method for displaying and searching for a location by using a grid and words, wherein when using a location keyword composed of a plurality of words, in order to provide a more user-friendly location keyword, it is possible to use a variable location keyword designated and registered to be used by the user together with an unchangeable fixed location keyword.

A still further object of the present invention is to provide a device and a method for displaying and searching for a location by using a grid and words, capable of various applications such as storage of location information, display and recording of location information, location reporting in an emergency, chauffeur calling, destination setting on a navigator, sending of an appointment location, emergency rescue request, and location recognition or location display technologies using voice recognition.

Technical Solution

According to an embodiment of the present invention for achieving some of the above-mentioned technical objects, a device for displaying and searching for a location by using a grid and words according to the present invention includes: a location keyword storage unit for storing information on grid IDs allocated to a plurality of unit grids for dividing a geographical area to be a location display object, respectively, and location keywords each of which has a structure having a plurality of words arranged therein, such that the grid IDs and the location keywords are matched to each other; a grid search unit that searches for a grid ID matched to a specific location keyword and outputs representative coordinates of a unit grid corresponding to the searched grid ID, if the specific location keyword is inputted; and a location keyword search unit that searches for at least one location keyword matched to the grid ID of a unit grid including geographical coordinates related to a specific location and outputs the searched location keyword, if the geographical coordinates are inputted.

The device for displaying and searching for a location may further include a grid information providing unit that contains area information and representative coordinate information on the unit grids corresponding to the grid IDs, and performs the followings: if geographical coordinates related to a specific location are inputted, searching for the grid ID of a unit grid including the geographical coordinates or converting the geographical coordinates into the grid ID, and providing the grid ID to the location keyword search unit; and if a grid ID searched for by the grid search unit is inputted, searching for representative coordinates of a unit grid corresponding to the searched grid ID or converting the grid ID into the representative coordinates, and providing the representative coordinates to the grid search unit.

The location keywords may be classified into fixed location keywords and variable location keywords, and the fixed location keywords may be unchangeable location keywords which are always matched to the grid IDs, and the variable location keywords may be location keywords registered separately from the fixed location keywords so as to be matched to the grid IDs by the user, and the location keyword storage unit may include: a fixed location keyword storage unit containing information for using a grid ID to search for a fixed location keyword corresponding thereto, and information for using a fixed location keyword to search for a grid ID corresponding thereto; and a variable location keyword storage unit containing information for using a grid ID to search for a variable location keyword corresponding thereto, and information for using a variable location keyword to search for a grid ID corresponding thereto.

In the case where a variable location keyword exists, the location keyword search unit may search for and output both of the variable location keyword and a fixed location keyword, and if a specific location keyword is inputted, the grid search unit may primarily search the fixed location keyword storage unit for a grid ID matched to the inputted location keyword, and output representative coordinates of a unit grid corresponding to the searched grid ID on a map, and in the case where the inputted location keyword is not a fixed location keyword, the grid search unit may search the variable location keyword storage unit.

In the case where a variable location keyword exists, the location keyword search unit may search for and output only the variable location keyword without searching for a fixed location keyword, and if a specific location keyword is inputted, the grid search unit may primarily search the fixed location keyword storage unit for a grid ID matched to the inputted location keyword, and output representative coordinates of a unit grid corresponding to the searched grid ID on a map, and in the case where the inputted location keyword is not a fixed location keyword, the grid search unit may search the variable location keyword storage unit.

The device for displaying and searching for a location may further include: a location keyword registration unit for registering variable location keywords corresponding to specific geographical coordinates or specific grid IDs, separately from the fixed location keywords, and storing the variable location keywords in the variable location keyword storage unit, according to user's needs, wherein, if a variable location keyword corresponding to specific geographical coordinates or a specific grid ID is inputted, the location keyword registration unit may determine whether to register the variable location keyword by determining whether words constituting the variable location keyword meet a restriction item, whether any of the words is included in banned words, and whether the variable location keyword is the same as any one of location keywords already registered.

In the case of using a grid ID to store a location keyword corresponding thereto, the location keyword storage unit may divide the grid ID into units, and hierarchically configure a storage route using the units of the grid ID, and store the corresponding location keyword, and in the case of using a location keyword to store a grid ID corresponding thereto, the location keyword storage unit may divide the location keyword into words, and hierarchically configure a storage route using the words, and store the corresponding grid ID.

In words which constitute the fixed location keywords and the variable location keywords, characters, numbers, specific characters, and symbols may be included.

The representative coordinates of each unit grid may be any one of the center point coordinates of the unit grid, the minimum coordinates of the unit grid, the maximum coordinates of the unit grid, and the coordinates of an arbitrary point in the unit grid.

According to another embodiment of the present invention for achieving some of the above-mentioned technical objects, a method of displaying and searching for a location according to the present invention includes: a preparing stage of allocating grid IDs to a plurality of unit grids for dividing a geographical area which is a location display object, respectively, and preparing a device containing information on the plurality of grid IDs and a plurality of unchangeable fixed location keywords which has been matched to the grid IDs, respectively, and each of which has a structure having a plurality of words arranged therein; a registering stage of registering variable location keywords each of which has a structure having a plurality of words arbitrarily determined by a user, so as to be matched to the grid IDs of specific unit grids including specific geographical coordinates wanted by a user; and a searching stage of searching for the grid ID of a unit grid including specific geographical coordinates or converting the specific geographical coordinates into the grid ID, and searching for and outputting at least one location keyword matched to the grid ID, if the specific geographical coordinates are inputted, and searching for a grid ID matched to a specific location keyword and outputting representative coordinates of a unit grid corresponding to the searched grid ID, if the specific location keyword is inputted.

If a variable location keyword is inputted for registration, the registering stage may determine whether to register the variable location keyword by determining whether words constituting the variable location keyword meet a restriction item, whether any of the words is included in banned words, and whether the variable location keyword is the same as any one of location keywords already registered.

In the case where a variable location keyword exists, the searching stage may search for and output both of the variable location keyword and a fixed location keyword.

In the case where a variable location keyword exists, the searching stage may search for and output only the variable location keyword without searching for a fixed location keyword.

If a specific location keyword is inputted, the searching stage may primarily search a fixed location keyword storage unit containing the fixed location keywords and the grid IDs matched to each other for a grid ID matched to the inputted location keyword, and output representative coordinates of a unit grid corresponding to the searched grid ID on a map, and in the case where the inputted location keyword is not a fixed location keyword, the searching stage may search a variable location keyword storage unit containing the variable location keywords and grid IDs matched to each other.

Advantageous Effects

According to the present invention, there is an advantage that it is possible to display a precise location substituting for coordinates in an online map service by displaying the location by arranging a plurality of words, and it is easy to memorize, and in communicating a location, a verbal communication is easy. Also, there is an advantage that location display and location indication for locations having no addresses or difficult to accurately indicate are possible, and location display is possible regardless of change of the addresses and change of the display mode.

Especially, there is an advantage that in using location keywords each of which is composed of a plurality of words, it is possible to provide an unchangeable fixed location keyword and a variable location keyword registered by a user at the same time, and it is possible to communicate a location by using a combination of more user-friendly words meaningful to each user.

Moreover, various applications such as storage of location information, display and recording of location information, location reporting in an emergency, chauffeur calling, destination setting on a navigator, sending of an appointment location, emergency rescue request, and location recognition or location display technologies using voice recognition are possible.

DESCRIPTION OF DRAWINGS

FIG. 3 is a view illustrating an example of storing grid IDs and location keywords.

FIG. 4 is a view illustrating an example of storing words constructing location keywords.

FIG. 5 is a view illustrating an example of a variable location keyword storage unit of FIG. 1 containing a variable location keyword and a grid ID matched to each other.

FIG. 9 is a view illustrating an example of grid information storing of a grid information providing unit of FIG. 1.

MODE FOR INVENTION

Hereinafter, a preferred embodiment of the present invention will be described in detail with reference to the accompanying drawings, without any intention other than the intention to provide a thorough understanding of the present invention to those skilled in the art to which the present invention pertains.

Figure 1:
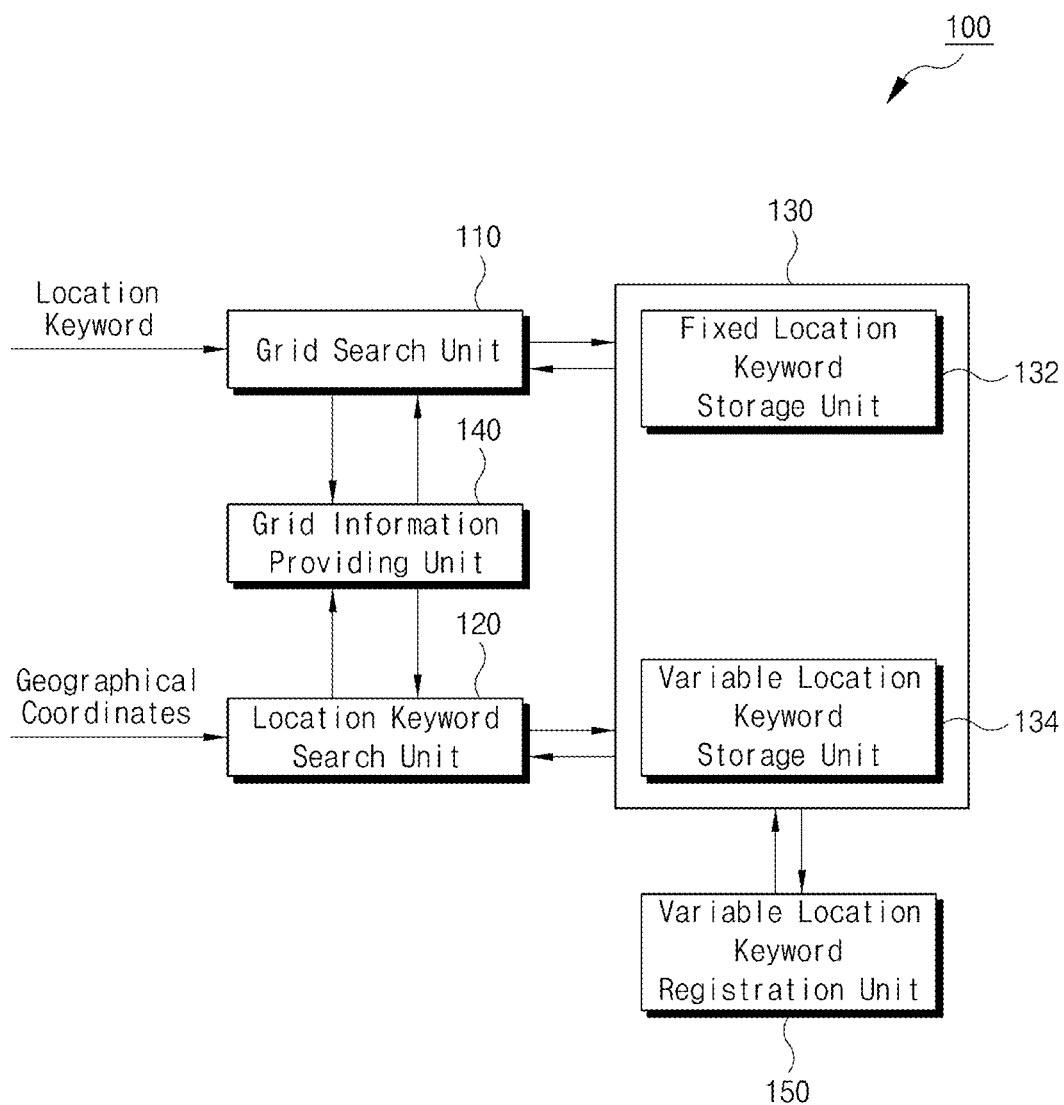
FIG. 1 is a block diagram of a device for displaying and searching for a location by using a grid and words according to an embodiment of the present invention.

FIG. 1 is a block diagram of a device 100 for displaying and searching for a location by using a grid and words according to an embodiment of the present invention.

As shown in FIG. 1, the device 100 for displaying and searching for a location according to the embodiment of the present invention is configured to perform the followings: dividing a geographical area which is a location display object into a plurality of unit grids; allocating grid IDs to the unit grids, respectively; storing location keywords each of which has a structure having a plurality of words arranged therein so as to be matched to the allocated grid IDs, respectively; if geographical coordinates in a specific unit grid are inputted, searching for and outputting a location keyword matched to the geographical coordinates; and if a specific location keyword is inputted, searching for the grid ID of a unit grid corresponding to the specific location keyword and outputting representative coordinates of the unit grid corresponding to the grid ID.

The device 100 for displaying and searching for a location may include a grid search unit 110, a location keyword search unit 120, a location keyword storage unit 130, and a grid information providing unit 140. Also, additionally, a variable location keyword registration unit 150 may be included, and the location keyword storage unit 130 may include a fixed location keyword storage unit 132 and a variable location keyword storage unit 134.

When a specific location keyword is inputted, the grid search unit 110 searches for a grid ID matched to the inputted location keyword, and outputs representative coordinates of a unit grid corresponding to the searched grid ID on a map.

If geographical coordinates related to a specific location are inputted, the location keyword search unit 120 searches for and outputs at least one location keyword matched to the grid ID of a unit grid including the geographical coordinates.

If geographical coordinates related to a specific location are inputted, the grid information providing unit 140 searches for the grid ID of a unit grid including the geographical coordinates, or converts the geographical coordinates into the grid ID, and provides the grid ID to the location keyword search unit 120.

Also, if a grid ID searched by the grid search unit 110 is inputted, the grid information providing unit 140 searches for the representative coordinates of a unit grid corresponding to the searched grid ID, or converts the grid ID into the representative coordinates, and provides the representative coordinates to the grid search unit 110.

In the case where the coordinate system of geographical coordinates which the grid information providing unit 140 needs to provide is different from a coordinate system in which the array of the unit grids of the geographical area has been defined, the grid information providing unit 140 may perform coordinate system conversion, and provide representative coordinates. Also, in the case where inputted geographical coordinates are different from the coordinate system in which the array of the unit grids of the geographical area has been defined, the grid information providing unit may perform coordinate system conversion on the geographical coordinates, and search for the grid ID of a unit grid including the converted geographical coordinates, using the converted geographical coordinates, or convert the geographical coordinates into the grid ID, and provide the grid ID to the location keyword search unit 120.

The grid information providing unit 140 may be configured to use a constant algorithm for performing conversion between the grid IDs and the representative coordinates; however, in the case where use of such an algorithm is impossible, the grid information providing unit may use a method of using a database table as shown in FIG. 9 to search for geographical coordinates or representative coordinates using a grid ID, or search for a grid ID using geographical coordinates or representative coordinates.

As shown in FIG. 9, the grid information providing unit 140 may contain area information and representative coordinate information of the unit grids corresponding to the grid IDs Grid_ID.

Here, the area information of a unit grid may include information on the minimum coordinates (minX, minY), maximum coordinates (maxX, maxY), center point coordinates (centerX, centerY) of the unit grid, and arbitrary coordinates in the unit grid, and the representative coordinates may mean information on coordinates selected as representative coordinates from the coordinates constituting the area of the unit grid. Here, the center point coordinates (centerX, centerY) of the unit grid may be set as representative coordinates; however, the minimum coordinates, the maximum coordinates, or the like may be set as representative coordinates, and it is also possible that the coordinates of an arbitrary specific point is set as representative coordinates.

In the procedure of performing conversion into a grid ID or searching for a grid ID by using geographical coordinates, for example, in the case of using the database table shown in FIG. 9, in order to search for the grid ID of a point having geographical coordinates X=812,345 and Y=1,634,567, it is possible to execute the following SQL query against a database table T_NPN containing the unit grids of the entire geographical area.

"select Grid_ID from T_NPN where X>=minX and X<maxX and Y>=minY and Y<maxY;"

Also, as an example of the method of searching for or performing conversion into geographical coordinates (X, Y) by using a grid ID Grid_ID, it is possible to execute the following SQL query against the database table T_NPN containing the unit grids of the entire geographical area in order to search for the center point coordinates (centerX, centerY) which are the representative coordinates of a unit grid having "Ga-Ga 0000 0000" as its grid ID Grid_ID.

"select centerX, centerY from T_NPN where Cell_ID='Ga-Ga 0000 0000';"

In the location keyword storage unit 130, the plurality of grid IDs and the plurality of location keywords each of which has a structure having a plurality of words arranged therein are stored such that the location keywords are matched to the grid IDs corresponding thereto, respectively, or the grid IDs are matched to the location keywords corresponding thereto, respectively.

In this case, a procedure of dividing a geographical area which is a location display object into a plurality of unit grids and allocating grid IDs to the unit grids, respectively, and a procedure of preparing location keywords each of which has a structure having a plurality of words arranged therein are necessary, and a procedure of storing the grid IDs and the location keywords corresponding to them so as to be matched to each other.

Herein, dividing a geographical area which is a location display object into a plurality of unit grids is known in the Korean national index number system, the British NGRS, the USNG of the United States, and so on. As an example, the case of performing division into unit grids using the Korean national index number system will be described below.

Figure 2:
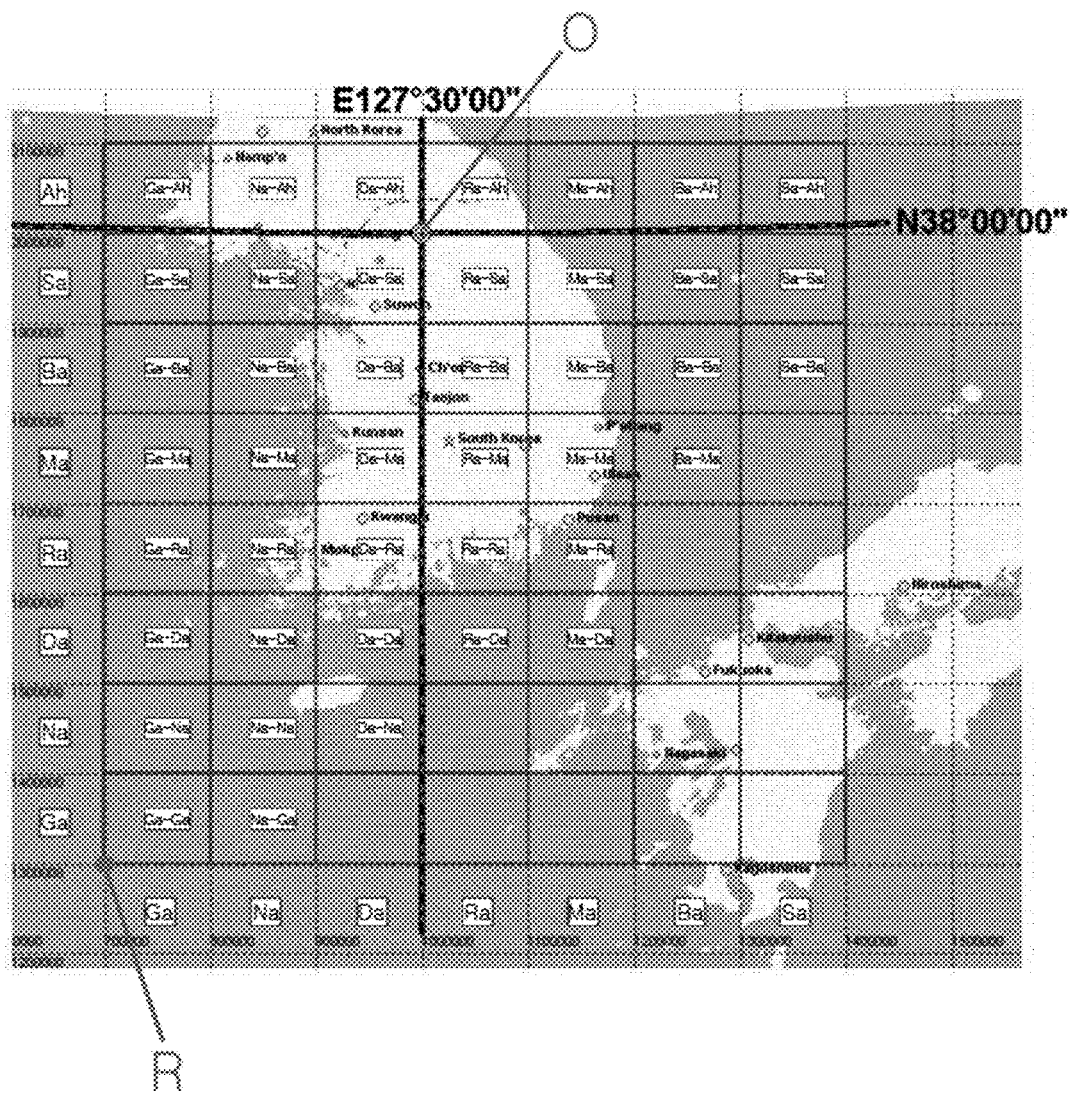
FIG. 2 is a map illustrating a procedure of making unit grids in the UTM-K coordinate system.

As shown in FIG. 2, it is possible to set a point located 300 km west and 700 km south of the origin O of the UTM-K coordinate system as a reference point R, and include an area to a point located 700 km east and 800 km north of the reference point (a point located 400 km east and 100 km north of the origin O of the UTM-K coordinate system). In this case, the entire location display object area may be defined in a rectangular shape or a square shape. Also, in the case where it is desired to include the entire Korean Peninsula in the entire location display object area, it is possible to expand the area in units of 100 km.

Here, the origin of the UTM-K coordinate system is at longitude 127°30'00" and latitude 38°00'00", and for prevention of confusion with the existing rectangular coordinate system and differentiation from the existing rectangular coordinate system, the numeric values of the origin are set to X(E)=1,000,000 m and Y(N)=2,000,000 m.

Then, in the case of dividing the geographical area which is the location display object into large unit grids having a square shape which measures 100 km by 100 km, east and north from the reference point R, the geographical area can be divided into a total of 56 large unit grids arranged in an 7-by-8 array in the direction from the west to the east (the transverse direction) and the direction from the south to the north (the longitudinal direction). Also, in the case of dividing each large unit grid into unit grids having a square shape which measures 10 m by 10 m while calculating the distances in the direction to the east and in the direction to the north with reference to the southwestern corner of the large unit grid, one large unit grid can be divided into 100 million unit grids. In this way, the 56 large unit grids can be divided into a total of 5.6 billion unit grids arranged in an 70000-by-80000 array in the transverse direction and the longitudinal direction. In the case of allocating grid IDs to these unit grids, respectively, 5.6 billion grid IDs are allocated.

Here, as the method of allocating grid IDs to the unit grids respectively, various methods can be used. It is possible to set the southwestern corner of the geographical area as a reference point R, and allocate grid IDs in the ascending order along the transverse direction which is the direction from the west to the east and the longitudinal direction which is the direction from the south to the north. Besides, it is possible to allocate grid IDs in the ascending order along the direction from the west to the east and the direction from the north to south with reference to the northwestern corner of the geographical area which is the location display object, and various methods are possible. Also, it is possible to reorganize the arrangement structure of unit grids into a logical arrangement structure, and allocate grid IDs.

For example, the Korean national index number system divides the X axis (the transverse axis on which values increase from the left toward the right) in units of 100,000 (at intervals of 100 Km), and allocates characters Ga, Na, Da, Ra, Ma, Ba, and Sa to the units, and divides the Y axis (the longitudinal axis on which values increase from the lower end toward the north end) in units of 100,000 (at intervals of 100 Km), and allocates characters Ga, Na, Da, Ra, Ma, Ba, Sa, and Ah to the units. Like this, the geographical areas defined as measuring 100 Km in width and length are named, whereby it is possible to discriminate the 56 large unit grids "Ga-Ga" to "Sa-Ah" each of which has the area of 100 Km². Then, the large unit grids each of which measures 100 Km in width and length are divided in units of m in width and length, and grid IDs are defined to discriminate 100 million unit grids which constitute one unit grid measuring 100 Km in width and length and each of which measures 10 m in width and length.

In this case, in the case where a grid ID is "Na-Ra 1234 3456", the X coordinate is a real number larger than or equal to the sum of 800,0000 "Na" and 12,340, i.e. 812,340 and smaller than the sum of 800,000 ("Na") and 12,350. Further, the Y coordinate is a real number larger than or equal to the sum of 1,600,000 ("Ra") and 34,560, i.e. 1,634,560 and smaller than the sum of 1,600,000 ("Ra") and 34,570, i.e. 1,634,570. In the case of providing the geographical coordinates to the grid information providing unit 140, in the case of providing the center point of the unit grid area as representative coordinates, the representative coordinates (X=812,345, Y=1,634,565) are provided.

In this case, the distance error ranges in width and length between the actual location coordinates and the coordinates which are provided are narrower than 5 m. The distance error ranges can be minimized by improving the degree of precision of definition of unit grid arrangement in the entire geographical object area. For example, in the example of the Korean national index numbers, in the case of defining unit grids which constitute the national index number system in smaller units of 1 m, not in units of 10 m, each grid ID may have a form like "Na-Ra 12345 34567", and in this case, it is possible to narrow the distance error ranges to 50 cm or less.

If grid IDs are allocated to the plurality of unit grids, respectively, in the case where specific geographical coordinates are selected, it becomes possible to see the unit grid including the corresponding geographical coordinates, and it becomes possible to see the grid ID of the corresponding unit grid. Therefore, it becomes possible to see the grid ID of the unit grid including the specific geographical coordinates. In other words, in the case where specific geographical coordinates are inputted, it becomes possible to see a grid ID corresponding thereto.

Next, as a location keyword which has a structure having a plurality of words arranged therein, a location keyword can be constructed with two words, three words, or four or more words.

Each location keyword has a structure having a plurality of words sequentially arranged therein, and may have a structure having nouns arranged therein, or may be constructed in a sentence form. For example, a location keyword may have the structure of "Sa-Rang Sa-Rang Sa-Rang" or "Sa-Rang Pyeong-Hwa Sa-Rang", and may have a structure having an adverb, an adjective, and a noun arranged therein, like "very happy people", or may have a word arrangement structure such as "this clean laboratory".

It is preferable that each location keyword have the structure of an arrangement of words easy to memorize and pronounce.

The procedure of storing the grid IDs and the location keywords corresponding thereto so as to be matched to each other will be described with reference to FIG. 3 and FIG. 4.

Each location keyword is constructed so as to have a structure having a plurality of words arranged therein, and the same number of location keywords as the grid IDs can be provided so as to be matched to the grid IDs.

In the case of using a grid ID to store a location keyword, it is possible to divide the grid ID into units, and hierarchically configure a storage route using the units of the grid ID, and store the corresponding location keywords, and in the case of using a location keyword to store a grid ID, it is possible to divide the location keyword into words, and hierarchically configure a storage route using the words, and store the corresponding grid ID.

In FIG. 3, (a) is a view illustrating an example of the case of using a grid ID to store a location keyword to be matched thereto, and in FIG. 3, (b) is a view illustrating an example of the case of using a location keyword to store a grid IDs to be matched thereto.

Here, it is assumed that as grid IDs, "Ga-Ga 0000 0000", "Ga-Ga 0000 0001", and "Ga-Ga 0000 0002" have been sequentially allocated, and "Ga-Ga 0001 0000", "Ga-Ga 0001 0001", "Ga-Ga 0001 0002", and so on have been allocated, and as location keywords corresponding thereto, location keywords such as "Sa-Rang Sa-Rang Sa-Rang", "Sa-Rang Sa-Rang Pyeong-Hwa", "Sa-Rang Sa-Rang Haeng-Bok", "Sa-Rang Pyeong-Hwa Sa-Rang", "Sa-Rang Pyeong-Hwa Haeng-Bok", "Sa-Rang Pyeong-Hwa Pyeong-Hwa", "Sa-Rang Pyeong-Hwa Haeng-Bok", and so on have been prepared.

As shown in (a) of FIG. 3, in the case of using the grid IDs to store the location keywords to be matched, each grid ID is divided from the front into certain units such as a unit consisting of the two front syllables, a unit consisting of the front four-digit number, and a unit consisting of the rear four-digit number, and a storage route is hierarchically configured, and the location keyword to be matched is stored.

More specifically, in this system, a top-level folder having "Ga-Ga" which is the part consisting of two syllables as the folder name is created, and in the top-level folder, subfolders having the front four-digit numbers "0000" and ""0001" as their names are created, and in each subfolder, files having the rear four-digit numbers "0000", "0001", and "0002" as their file names are created, and in the created files, the corresponding location keywords are stored.

For example, in the above-mentioned system, in the top-level folder named "Ga-Ga", there are subfolders, i.e. the folders having the names "0000" and "0001" using the front four-digit numbers, and in the folder named "0000", a file named "0000" and containing the location keyword "Sa-Rang Sa-Rang Sa-Rang", a file named "0001" and containing the location keyword "Sa-Rang Sa-Rang Pyeong-Hwa", and a file named "0002" and containing the location keyword "Sa-Rang Sa-Rang Haeng-Bok" are stored. Moreover, in the folder named "0001", a file named "0000" and containing the location keyword "Sa-Rang Pyeong-Hwa Sa-Rang", a file named "0001" and containing the location keyword "Sa-Rang Pyeong-Hwa Pyeong-Hwa", and a file named "0002" and containing the location keyword "Sa-Rang Pyeong-Hwa Haeng-Bok" are stored.

When this system is used as the storing system, in the case where a grid ID is inputted, it is possible to search for a location keyword matched thereto by finding a storage route corresponding to the grid ID. Therefore, there is an advantage that the search time shortens and searching is easy.

As shown in (b) of FIG. 3, in the case of using a location keyword to store a grid ID to be matched, a storage route is hierarchically configured by dividing the location keyword into words.

More specifically, in the above-mentioned system, a top-level folder having the foremost word constituting the location keyword as the name of the top-level folder is created. Next, in the top-level folder, a subfolder having the middle word as the name of the subfolder is created, and in the subfolder, a file having the last word as the name of the file is created, and in the generated file, the corresponding grid keyword is stored.

For example, in a top-level folder named "Sa-Rang", as subfolders, a folder "Sa-Rang", a folder "Pyeong-Hwa", and a folder "Haeng-Bok" are created, and in the folder "Sa-Rang", a file "Sa-Rang", a file "Pyeong-Hwa", and a file "Haeng-Bok" are created, and in the file "Sa-Rang", the grid ID "Ga-Ga 0000 0000" matched thereto is stored, and in the file "Pyeong-Hwa", the grid ID "Ga-Ga 0000 0001" matched thereto is stored, and in the file "Haeng-Bok", the grid ID "Ga-Ga 0000 0002" matched thereto is stored.

When this system is used as the storing system, in the case where a location keyword is inputted, it is possible to search for a grid ID matched thereto by finding a storage route corresponding to the location keyword. Therefore, there is an advantage that the search time shortens and searching is easy.

This storing system may be inconvenient in the case where a geographical area is wide and the geographical areas of unit grids become smaller, whereby the number of unit grids increases. In this case, a system for storing grid IDs and location keywords in separate files as shown in (a) of FIG. 4, or storing grid IDs and location keywords in a memory as shown in (b) of FIG. 4, or storing grid IDs and location keywords in a matching table or the like as shown in (c) of FIG. 4, and matching the grid IDs and the location keywords to each other using a separate algorithm may be used.

For example, in the case where each location keyword is a combination of three words, for example, if the number of unit grids is 5.6 billions, in order to allocate location keywords each of which consists of three words to the 5.6 billion unit grids, respectively, since the cube of 1775 is 5,592,359,375 and the cube of 1776 is 5,601,816,567, at least 1776 unique words are required. Therefore, it is possible to select 1776 unique words and allocate word IDs to the words, respectively. For example, it is possible to allocate a word ID "0" to the word "Sa-Rang", allocate a word ID "1" to the word "Pyeong-Hwa", and allocate a word ID "2" to the word "Haeng-Bok". The word ID allocating method can be modified in various forms.

In this case, when a grid ID is inputted, the location keyword search unit 120 may construct a location keyword by selecting three word IDs corresponding to the grid ID and combining words corresponding to the selected word IDs in a predetermined order. In the case where a location keyword is inputted, the grid search unit 110 may select the word IDs of the words constituting the location keyword, and select a grid ID corresponding to the selected word IDs.

Meanwhile, location keywords may be divided into fixed location keywords and variable location keywords. Fixed location keywords can mean location keywords which are always matched to grid IDs and are unchangeable. In other words, fixed location keywords can mean location keywords which are default values or predetermined values, and are selected and stored so as to be matched to grid IDs, and cannot be changed or erased.

Variable location keywords can mean location keywords registered to be matched to grid IDs separately from fixed location keywords by a user. To one grid ID, a fixed location keyword is matched in advance; however, the matched fixed location keyword may not be user's taste, and may give an unpleasant feeling to some users or some languages may not sound well. In this case, the user can register desired variable location keywords so as to be matched to grid IDs such that it is possible to display the locations of the geographical coordinates.

Variable location keywords are not matched to all grid IDs, and only variable location keywords registered via the variable location keyword registration unit 150 by the user are stored so as to be matched to specific grid IDs. For example, when there is a geographical location specially meaningful to the user, and the user wants to register a location keyword having a special meaning for the grid ID of a unit grid including the corresponding geographical location, it is possible to use a variable location keyword.

In the case where location keywords are divided into fixed location keywords and variable location keywords, the location keyword storage unit 130 may be divided into the fixed location keyword storage unit 132 and the variable location keyword storage unit 134.

In this case, when a specific location keyword is inputted, the grid search unit 110 can determine whether the specific location keyword is a fixed location keyword or a variable location keyword, and search the fixed location keyword storage unit 132 or the variable location keyword storage unit 134 on the basis of the determination result.

In contrast with this, when a specific location keyword is inputted, the grid search unit 110 may search both of the fixed location keyword storage unit and the variable location keyword storage unit 134 for a grid ID matched to the inputted location keyword, without determining whether the specific location keyword is a fixed location keyword or a variable location keyword, and outputs the geographical reference coordinates of a unit grid corresponding to the searched grid ID.

In the fixed location keyword storage unit 132, information for using grid IDs to search for fixed location keywords corresponding thereto, and information for using fixed location keywords to search for grid IDs corresponding thereto are stored. As described with reference to FIG. 3 and FIG. 4, in the fixed location keyword storage unit 132, fixed location keywords and grid IDs are stored such as the fixed location keywords and the grid IDs are matched to each other.

In the variable location keyword storage unit 134, information for using grid IDs to search for variable location keywords corresponding thereto, and information for using variable location keywords to search for grid IDs corresponding thereto are stored. In the variable location keyword storage unit 134, variable location keywords registered via the variable location keyword registration unit 150 are stored so as to be matched to grid IDs corresponding thereto.

The variable location keyword storage unit 134 may store variable location keywords and grid IDs by the method described with reference to FIG. 3 and FIG. 4, such that the variable location keywords and the grid IDs are matched to each other; however, it also is possible to store them using a database management system (DBMS) as shown in FIG. 5.

FIG. 5 is a view illustrating an example of the variable location keyword storage unit 134 containing variable location keywords and grid IDs matched to each other.

As shown in FIG. 5, the variable location keyword storage unit 134 has a T-Uni_Loca_Key table having a variable location keyword column containing a variable location keyword which is a primary key PK and a grid ID Grid_ID corresponding thereto. At this time, a fixed location keyword corresponding the grid ID Grid_ID may be stored together, and the minimum coordinates (minX, minY), maximum coordinates (maxX, maxY), center point coordinates (centerX, centerY), and so on of a unit grid corresponding thereto may be stored as the area information of the unit grid. Also, a variety of information including information for calculating a period, such as the create time (CreateDate), update time (UpdatedDate), expiration time (ExpireDate), and so on of the variable location keyword, information for identifying a registered user (admin_Email), and so on may be stored together according to the purpose of the service and the need.

In the case of FIG. 5, it can be seen that in the variable location keyword storage unit 134, with respect to the grid ID "Ga-Ga 0000 0000", a variable location keyword "Beautiful Our Nature" has been registered and stored, and a fixed location keyword "Sa-Rang Sa-Rang Sa-Rang" has been stored.

In this case, when the grid ID or geographical coordinates corresponding to the grid ID are inputted, the location keyword search unit 120 searches the variable location keyword storage unit 134 for the variable location keyword "Beautiful Our Nature" corresponding thereto, and outputs the variable location keyword, and searches the fixed location keyword storage unit 132 for the fixed location keyword "Sa-Rang Sa-Rang Sa-Rang" corresponding thereto, and outputs the fixed location keyword.

In the case where a variable location keyword exists, the location keyword search unit 120 searches for both of the fixed location keyword and the variable location keyword and outputs them; however, according to the user's settings, only in the case where the variable location keyword exists, the location keyword search unit may output only the variable location keyword without outputting a fixed location keyword.

For example, in the case where the grid ID "Ga-Ga 0000 0000" is inputted, since there is the variable location keyword, the location keyword search unit 120 may output only the variable location keyword without searching for the fixed location keyword. The reason is that in the case where the user has registered a variable location keyword, the user may want to replace the variable location keyword for a fixed location keyword.

For this, when a grid ID is inputted, the location keyword search unit 120 may primarily search the variable location keyword storage unit 134 for a variable location keyword, and outputs the searched variable location keyword. If any variable location keyword corresponding thereto is not searched for, the location keyword search unit may secondarily search the fixed location keyword storage unit 132 for a fixed location keyword corresponding thereto, and output the fixed location keyword.

Meanwhile, according to the user's needs, the variable location keyword registration unit 150 registers a variable location keyword corresponding to specific geographical coordinates or a specific grid ID, separately from a fixed location keyword, and stores the variable location keyword in the variable location keyword storage unit 134.

Figure 6:
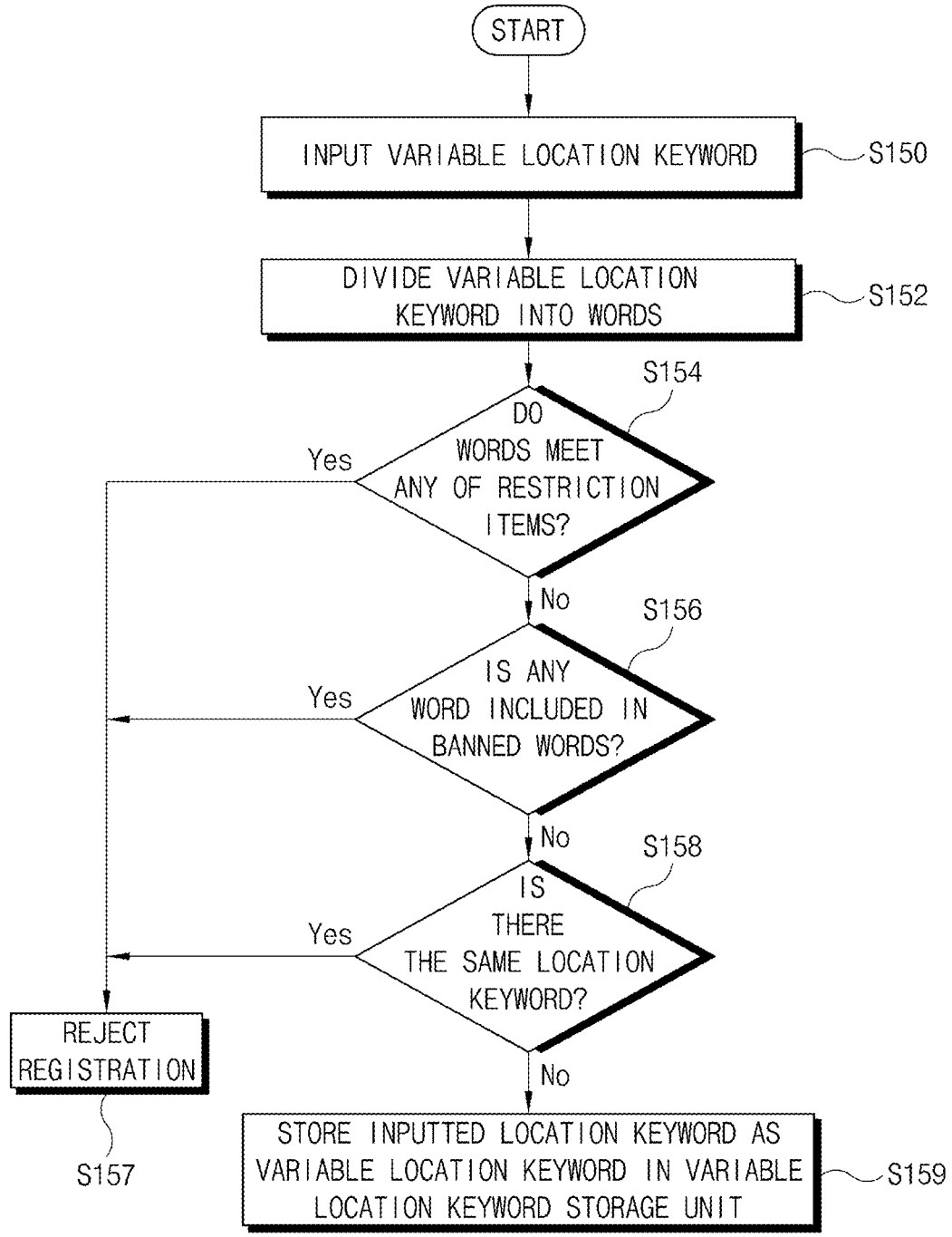
FIG. 6 is a view illustrating an operation flow chart of a variable location keyword registration unit of FIG. 1.

FIG. 6 shows the operation flow chart of the variable location keyword registration unit 150.

As shown in FIG. 6, if a location keyword corresponding to specific geographical coordinates or a specific grid ID is inputted in order to register the location keyword as a variable location keyword by the user (S150), the location keyword registration unit 150 divides the inputted location keyword into words (S152).

Next, the location keyword registration unit determines whether the words constituting the inputted location keyword meet predetermined restriction items (S154). As examples of the restriction items, there are a restriction item on the number of characters in each word, a restriction item on using of a combination of different languages and characters such as Korean characters and English characters, a restriction item on using of a combination of numbers and characters, whether a list of words constituting fixed location keywords separately exists and all of the words are matched with words included in the word list, and so on.

If the words constituting the location keyword inputted for registration meet any of the predetermined restriction items (Yes), the location keyword registration unit rejects registration of the inputted location keyword as a variable location keyword (S157). If the words constituting the location keyword do not meet the predetermined restriction items (No), the location keyword registration unit determines whether any of the words constituting the location keyword is included predetermined banned words (S156). The banned words are words including slang words, forbidden words and so on, and may include words which give a feeling of strangeness or a feeling of discomfort when they are registered, or are difficult to be registered for other reasons.

If any of the words constituting the location keyword inputted for registration is included in the predetermined banned words (Yes), the location keyword registration unit rejects registration of the inputted location keyword as a variable location keyword (S157). If the words constituting the location keyword inputted for registration are not included in the predetermined banned words (No), the location keyword registration unit determines whether the same location keyword as the inputted location keyword exists (S158).

Here, in order to determine whether the same location keyword exists, all location keywords stored in the location keyword storage unit 130, i.e. all fixed location keywords and all variable location keywords are searched. In other words, in order to determine whether the same location keyword exists, all fixed location keywords stored in the fixed location keyword storage unit 132 and all variable location keywords stored in the variable location keyword storage unit 134 are searched.

If the same location keyword as the location keyword inputted for registration is in the location keyword storage unit 130 (Yes), the location keyword registration unit rejects registration of the inputted location keyword as a variable location keyword. If any location keyword consisting of the same words as those constituting the location keyword inputted for registration is not in the location keyword storage unit 130 (No), the location keyword registration unit registers and stores the inputted location keyword as a variable location keyword in the variable location keyword storage unit 134 (S159). At this time, the variable location keyword which is registered and stored is stored so as to be matched to a grid ID or location information such as geographical coordinates corresponding thereto.

Figure 7:
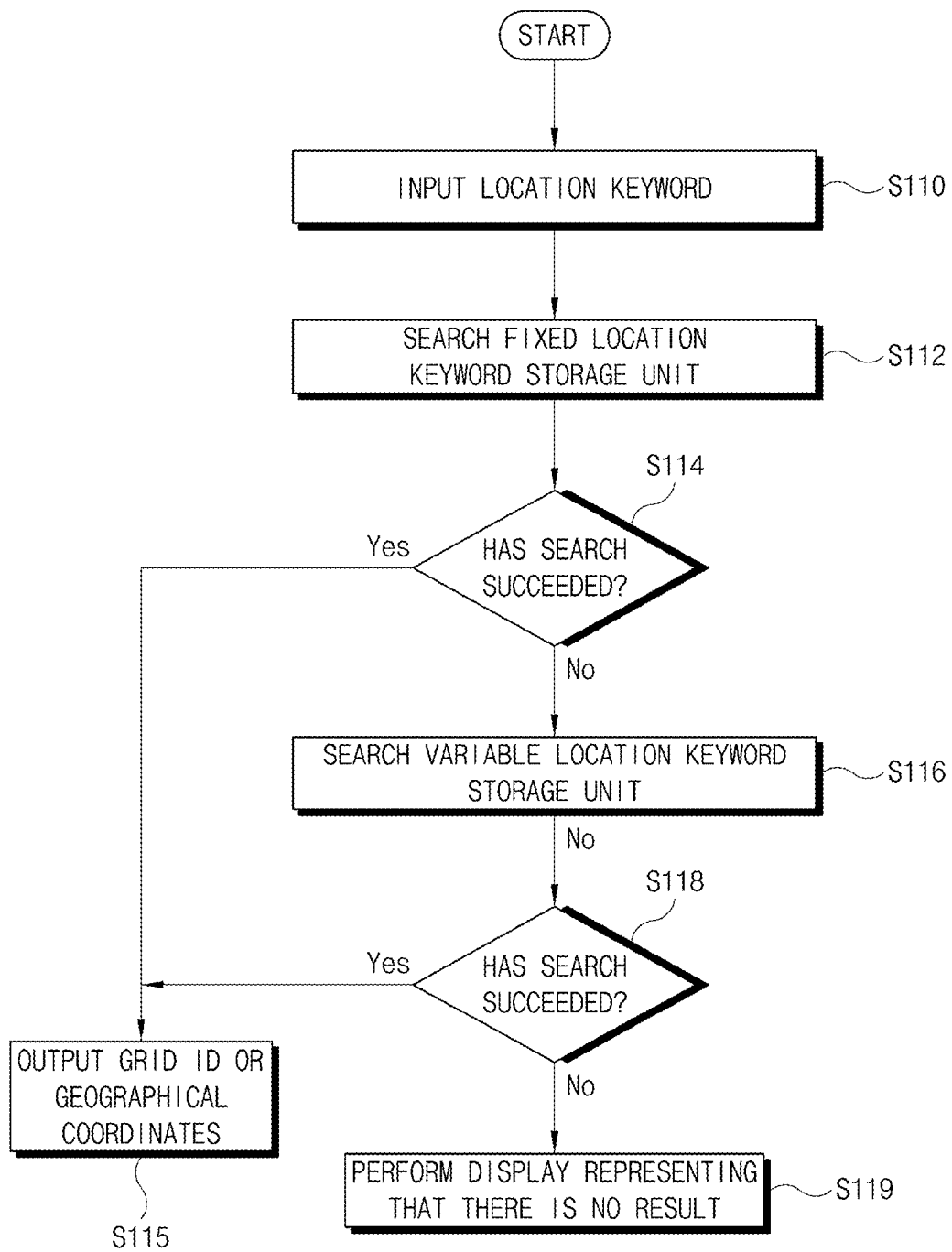
FIG. 7 is a view illustrating an operation flow chart of a grid search unit of FIG. 1.

FIG. 7 shows an operation flow chart of the grid search unit 110.

As shown in FIG. 7, when a specific location keyword is inputted, the grid search unit 110 searches for a grid ID matched to the inputted location keyword, and outputs the representative coordinates of a unit grid corresponding to the searched grid ID on the map.

Specifically, if a specific location keyword is inputted (S110), the grid search unit primarily searches the fixed location keyword storage unit 132 (S112). The grid search unit determines whether searching has succeeded (S114), and if it is determined as the search result that there is the same fixed location keyword as the inputted location keyword, and there is a grid ID which is information corresponding thereto (Yes), the grid search unit outputs the grid ID or representative coordinates corresponding thereto (S115). Here, the grid search unit can obtain the representative coordinates via the grid information providing unit 140.

If it is determined as the search result that there is no grid ID corresponding to the inputted location keyword (No), the grid search unit searches the variable location keyword storage unit 134 (S116). If it is determined as the search result that there is the same variable location keyword as the inputted location keyword, and there is a grid ID which is information corresponding thereto (Yes), the grid search unit outputs the grid ID or representative coordinates corresponding thereto (S115). Here, the grid search unit can obtain the representative coordinates via the grid information providing unit 140.

If it is determined as the search result that there is no grid ID corresponding to the inputted location keyword in the variable location keyword storage unit 134 (No), the grid search unit performs display representing that there is no result, and terminates the search (S119).

FIG. 3 and FIG. 5 will be described as examples. In the case where the location keyword "Sa-Rang Sa-Rang Pyeong-Hwa" is inputted, the grid search unit opens the file "Pyeong-Hwa" in the directory "D:/Sa-rang/Sa-rang" in the grid ID search data stored as shown in (b) of FIG. 3 in the fixed location keyword storage unit 132, and searches for and outputs the content of the file, i.e. "Ga-Ga 0000 0001" as the grid ID.

In the case where the grid ID search on the fixed location keyword storage unit 132 has succeeded, the grid search unit outputs the searched grid ID "Ga-Ga 0000 0001".

In the case where a variable location keyword "I am here" is inputted, a directory "D:/I/am" containing a file "here" is not searched from the search data in the fixed location keyword storage unit 132. In this case, the grid search unit searches the variable location keyword storage unit 134. In this case, the grid search unit executes an SQL query for searching for a grid ID Grid_ID corresponding to the variable location keyword "I am here" against a database table T_Uni-Loca_Key containing variable location keywords as shown in FIG. 5.

"select Cell_ID from T_Uni_Loca_Key where variable location keyword='I am here';"

When it is assumed that the grid search unit has obtained the grid ID Grid_ID "Ga-Ga 0000 0001" as the result of the SQL query, the grid search unit outputs the searched grid ID Grid_ID "Ga-Ga 0000 0001".

Figure 8:
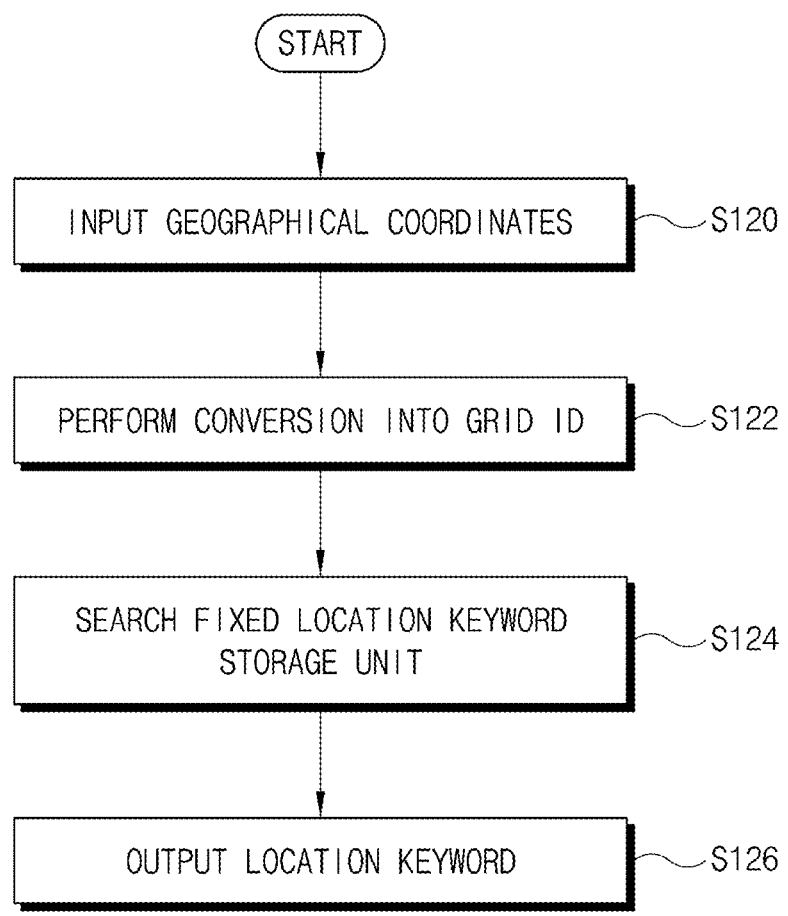
FIG. 8 is an operation flow chart of a location keyword search unit of FIG. 1.

FIG. 8 is an operation flow chart of the location keyword search unit 120.

As shown in FIG. 8, if geographical coordinates related to a specific location are inputted, the location keyword search unit 120 searches for at least one location keyword matched to the grid ID of a unit grid including the geographical coordinates, and outputs the searched location keyword.

Specifically, if geographical coordinates are inputted, the location keyword search unit 120 provides the inputted geographical coordinates to the grid information providing unit 140, and receives a grid ID corresponding to the geographical coordinates and obtained by conversion (S122). In this case, it can be considered as the geographical coordinates are converted into the grid ID corresponding thereto by the grid information providing unit 140.

In the case where the grid ID is inputted and in the case where the grid ID obtained by conversion is received, the location keyword search unit searches the location keyword storage unit 130 using the grid ID (S124). The location keyword search unit outputs the fixed location keyword and the variable location keyword corresponding thereto as the search results (S126). If any location keyword corresponding thereto is not searched for, the location keyword search unit outputs display representing that there is no result.

For example, when the grid ID is "Ga-Ga 0000 0001", the location keyword search unit opens a file "0001" in the directory "D:/Ga-Ga/0000" in the grid ID reference search data (see (a) of FIG. 3) stored as shown in FIG. 3 in the fixed location keyword storage unit 132, and searches for and outputs the content of the file, i.e. "Sa-Rang Sa-Rang Pyeong-Hwa" as the fixed location keyword.

In the case of searching the variable location keyword storage unit 134 for a variable location keyword, the location keyword search unit executes an SQL query for searching for a variable location keyword corresponding to the grid ID Grid_ID "Ga-Ga 0000 0001" against the database table T_Uni-Loca_Key of FIG. 5 containing variable location keywords.

(select variable location keyword from T_Uni_Loca_Key where Cell_ID='Ga-Ga 0000 0001';)

When it is assumed that the variable location keyword "I am here" has been obtained by the SQL query, the fixed location keyword and the variable location keyword obtained by the search are outputted in forms like "<fixed location keyword> Sa-Rang Sa-Rang Pyeong-Hwa </fixed location keyword>" and "<variable location keyword> I am here </variable location keyword>".

Here, in the case where a variable location keyword exists, the location keyword search unit 120 searches for the variable location keyword and a fixed location keyword and outputs them together; however, according to user's settings, in the case where a variable location keyword exists, the location keyword search unit may output only the variable location keyword without outputting a fixed location keyword.

In other words, the location keyword search unit 120 may search for and output only the variable location keyword without searching for the fixed location keyword. The reason is that in the case where the user has registered a variable location keyword, the user may want to replace the variable location keyword for the fixed location keyword such that the fixed location keyword is not outputted.

For this, when a grid ID is inputted, the location keyword search unit 120 may primarily searches the variable location keyword storage unit 134, and outputs a searched variable location keyword. If any variable location keyword corresponding thereto is not searched for, the location keyword search unit may secondarily search the fixed location keyword storage unit 132 for a fixed location keyword corresponding thereto, and output the fixed location keyword.

In the present invention, in words which constitute fixed location keywords and variable location keywords, characters, numbers, special characters, and symbols may be included. For example, each of combinations of numbers and characters, such as 1st, 2nd, and 3rd may be classified as one word, and each of &, @, $, and the like may be classified as one word, and each of numbers such as 1, 2, 3, and so on may be classified as one word because they can be represented by one, two, three, and so on.

As described above, according to the present invention, there is an advantage that it is possible to display a precise location substituting for coordinates in an online map service by displaying the location by arranging a plurality of words, and it is easy to memorize, and in communicating a location, a verbal communication is easy. Also, there is an advantage that location display and location indication for locations having no addresses or difficult to accurately indicate are possible, and location display is possible regardless of change of the addresses and change of the display mode.

Especially, there is an advantage that in using location keywords each of which is composed of a plurality of words, it is possible to provide an unchangeable fixed location keyword and a variable location keyword registered by a user at the same time, and it is possible to communicate a location by using a combination of more user-friendly words meaningful to each user.

Moreover, various applications such as storage of location information, display and recording of location information, location reporting in an emergency, chauffeur calling, destination setting on a navigator, sending of an appointment location, emergency rescue request, and location recognition or location display technologies using voice recognition are possible.

Although the embodiment has been described with reference to the drawings for a more thorough understanding of the present invention, it is just illustrative, and should not be construed as limiting the present invention. Also, it is apparent that those skilled in the art can make various modifications and variations without departing from the basic principle of the present invention.

The invention claimed is:

1. A device for displaying and searching for a location by using a grid and words, comprising:
a storage device that stores information on grid identifiers (IDs) allocated to a plurality of unit grids for dividing a geographical area to be a location display object, respectively, and location keywords each of which has a structure having a plurality of words arranged therein, such that the grid IDs and the location keywords are matched to each other; and
one or more processors that
search for a grid identifier (ID) matched to a specific location keyword and output representative coordinates of a unit grid corresponding to the searched grid ID, if the specific location keyword is inputted, and
search for at least one location keyword matched to the grid ID of a unit grid including geographical coordinates related to a specific location and output the searched location keyword, if the geographical coordinates are inputted,
wherein each of the location keywords has a structure having nouns arranged therein, or a structure having words arranged so as to construct a sentence,
wherein the location keywords are classified into fixed location keywords and variable location keywords, the fixed location keywords are unchangeable location keywords which are always matched to the grid IDs, and the variable location keywords are location keywords registered separately from the fixed location keywords so as to be matched to the grid IDs by the user,
wherein the storage device includes
a fixed location keyword storage containing information for using a grid ID to search for a fixed location keyword corresponding thereto, and information for using a fixed location keyword to search for a grid ID corresponding thereto, and
a variable location keyword storage containing information for using a grid ID to search for a variable location keyword corresponding thereto, and information for using a variable location keyword to search for a grid ID corresponding thereto, and
wherein in the case where a variable location keyword exists, the one or more processors search for and output both of the variable location keyword and a fixed location keyword,
if a specific location keyword is inputted, the one or more processors primarily search the fixed location keyword storage for a grid ID matched to the inputted location keyword, and output representative coordinates of a unit grid corresponding to the searched grid ID on a map, and
in the case where the inputted location keyword is not a fixed location keyword, the one or more processors search the variable location keyword storage.

2. The device for displaying and searching for a location according to claim 1,
wherein the one or more processors:
contain area information and representative coordinate information on the unit grids corresponding to the grid IDs;
if geographical coordinates related to a specific location are inputted, search for the grid ID of a unit grid including the geographical coordinates or convert the geographical coordinates into the grid ID, and provide the grid ID to the location keyword search unit; and
if a grid ID searched for by the grid search unit is inputted, search for representative coordinates of a unit grid corresponding to the searched grid ID or convert the grid ID into the representative coordinates, and provide the representative coordinates to the grid search unit.

3. The device for displaying and searching for a location according to claim 1, wherein:
in the case of using a grid ID to store a location keyword corresponding thereto, the one or more processors divide the grid ID into units, and hierarchically configure a storage route using the units of the grid ID, and store the corresponding location keyword, and
in the case of using a location keyword to store a grid ID corresponding thereto, the one or more processors divide the location keyword into words, and hierarchically configure a storage route using the words, and store the corresponding grid ID.

4. The device for displaying and searching for a location according to claim 1, wherein:
in words which constitute the fixed location keywords and the variable location keywords, numbers which can be represented by characters, specific characters, and symbols are included.

5. The device for displaying and searching for a location according to claim 1, wherein:
the representative coordinates of each unit grid is any one of the center point coordinates of the unit grid, the minimum coordinates of the unit grid, the maximum coordinates of the unit grid, and the coordinates of an arbitrary point in the unit grid.

6. A device for displaying and searching for a location by using a grid and words, comprising:
a storage device that stores information on grid identifiers (IDs) allocated to a plurality of unit grids for dividing a geographical area to be a location display object, respectively, and location keywords each of which has a structure having a plurality of words arranged therein, such that the grid IDs and the location keywords are matched to each other; and
one or more processors that
search for a grid identifier (ID) matched to a specific location keyword and output representative coordinates of a unit grid corresponding to the searched grid ID, if the specific location keyword is inputted, and
search for at least one location keyword matched to the grid ID of a unit grid including geographical coordinates related to a specific location and output the searched location keyword, if the geographical coordinates are inputted,
wherein each of the location keywords has a structure having nouns arranged therein, or a structure having words arranged so as to construct a sentence,
wherein the location keywords are classified into fixed location keywords and variable location keywords, the fixed location keywords are unchangeable location keywords which are always matched to the grid IDs, and the variable location keywords are location keywords registered separately from the fixed location keywords so as to be matched to the grid IDs by the user, wherein the storage device includes
- a fixed location keyword storage containing information for using a grid ID to search for a fixed location keyword corresponding thereto, and information for using a fixed location keyword to search for a grid ID corresponding thereto, and
- a variable location keyword storage containing information for using a grid ID to search for a variable location keyword corresponding thereto, and information for using a variable location keyword to search for a grid ID corresponding thereto, and wherein in the case where a variable location keyword exists, the one or more processors search for and output only the variable location keyword without searching for a fixed location keyword, if a specific location keyword is inputted, the one or more processors primarily search the fixed location keyword storage for a grid ID matched to the inputted location keyword, and output representative coordinates of a unit grid corresponding to the searched grid ID on a map, and in the case where the inputted location keyword is not a fixed location keyword, the one or more processors search the variable location keyword storage.

7. A device for displaying and searching for a location by using a grid and words, comprising:
- a storage device that stores information on grid identifiers (IDs) allocated to a plurality of unit grids for dividing a geographical area to be a location display object, respectively, and location keywords each of which has a structure having a plurality of words arranged therein, such that the grid IDs and the location keywords are matched to each other; and
- one or more processors that
  - search for a grid identifier (ID) matched to a specific location keyword and output representative coordinates of a unit grid corresponding to the searched grid ID, if the specific location keyword is inputted, and
  - search for at least one location keyword matched to the grid ID of a unit grid including geographical coordinates related to a specific location and output the searched location keyword, if the geographical coordinates are inputted, wherein each of the location keywords has a structure having nouns arranged therein, or a structure having words arranged so as to construct a sentence, wherein the location keywords are classified into fixed location keywords and variable location keywords, the fixed location keywords are unchangeable location keywords which are always matched to the grid IDs, and the variable location keywords are location keywords registered separately from the fixed location keywords so as to be matched to the grid IDs by the user, wherein the storage device includes
- a fixed location keyword storage containing information for using a grid ID to search for a fixed location keyword corresponding thereto, and information for using a fixed location keyword to search for a grid ID corresponding thereto, and
- a variable location keyword storage containing information for using a grid ID to search for a variable location keyword corresponding thereto, and information for using a variable location keyword to search for a grid ID corresponding thereto, wherein the one or more processors register variable location keywords corresponding to specific geographical coordinates or specific grid IDs, separately from the fixed location keywords, and store the variable location keywords in the variable location keyword storage, according to user's needs, and wherein, if a variable location keyword is inputted, the one or more processors determine whether to register the variable location keyword by determining whether words constituting the variable location keyword meet a restriction item, whether any of the words is included in banned words, and whether the variable location keyword is the same as any one of location keywords already registered.

8. A method of displaying and searching for a location, comprising:
- a preparing stage of allocating grid identifiers (IDs) to a plurality of unit grids for dividing a geographical area which is a location display object, respectively, and preparing a device containing information on the plurality of grid IDs and a plurality of unchangeable fixed location keywords which have been matched to the grid IDs, respectively, and each of which has a structure having a plurality of words arranged therein;
- a registering stage of registering variable location keywords each of which has a structure having a plurality of words arbitrarily determined by a user, so as to be matched to the grid IDs of specific unit grids including specific geographical coordinates wanted by a user; and
- a searching stage of searching for a grid identifier (ID) of a unit grid including specific geographical coordinates or converting the specific geographical coordinates into the grid ID, and searching for and outputting at least one location keyword matched to the grid ID, if the specific geographical coordinates are inputted, and searching for a grid ID matched to a specific location keyword and outputting representative coordinates of a unit grid corresponding to the searched grid ID, if the specific location keyword is inputted, wherein if a variable location keyword is inputted for registration, the registering stage determines whether to register the variable location keyword by determining whether words constituting the variable location keyword meet a restriction item, whether any of the words is included in banned words, and whether the variable location keyword is the same as any one of location keywords already registered.

9. The method of displaying and searching for a location according to claim 8, wherein:
in the case where a variable location keyword exists, the searching stage searches for and outputs both of the variable location keyword and a fixed location keyword.

10. The method of displaying and searching for a location according to claim 8, wherein:
in the case where a variable location keyword exists, the searching stage searches for and outputs only the variable location keyword without searching for a fixed location keyword.

11. A method of displaying and searching for a location, comprising:
- a preparing stage of allocating grid identifiers (IDs) to a plurality of unit grids for dividing a geographical area which is a location display object, respectively, and preparing a device containing information on the plurality of grid IDs and a plurality of unchangeable fixed location keywords which have been matched to the grid IDs, respectively, and each of which has a structure having a plurality of words arranged therein;

a registering stage of registering variable location keywords each of which has a structure having a plurality of words arbitrarily determined by a user, so as to be matched to the grid IDs of specific unit grids including specific geographical coordinates wanted by a user; and a searching stage of searching for a grid identifier (ID) of a unit grid including specific geographical coordinates or converting the specific geographical coordinates into the grid ID, and searching for and outputting at least one location keyword matched to the grid ID, if the specific geographical coordinates are inputted, and searching for a grid ID matched to a specific location keyword and outputting representative coordinates of a unit grid corresponding to the searched grid ID, if the specific location keyword is inputted, wherein if a specific location keyword is inputted, the searching stage primarily searches a fixed location keyword storage unit containing the fixed location keywords and the grid IDs matched to each other for a grid ID matched to the inputted location keyword, and outputs representative coordinates of a unit grid corresponding to the searched grid ID on a map, and wherein in the case where the inputted location keyword is not a fixed location keyword, the searching stage searches a variable location keyword storage unit containing the variable location keywords and grid IDs matched to each other.

\* \* \* \* \*